United States Patent
Onizaki et al.

(10) Patent No.: US 6,283,111 B1
(45) Date of Patent: Sep. 4, 2001

(54) WIRE SAW CUTTING METHOD AND APPARATUS THEREFOR

(75) Inventors: Kazunori Onizaki, Kishima-gun; Kenji Ogawa, Kitamatsuura-gun, both of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/594,579

(22) Filed: Jun. 15, 2000

(30) Foreign Application Priority Data

Jun. 18, 1999 (JP) .................................................. 11-172194

(51) Int. Cl.⁷ ...................................................... B28D 1/06
(52) U.S. Cl. ............................................ 125/16.01; 125/21
(58) Field of Search .................................. 125/12, 16.01, 125/16.02, 21, 22, 14

(56) References Cited

U.S. PATENT DOCUMENTS 5,201,305 * 4/1993 Takeuchi ........................... 125/16.02
5,771,876 * 6/1998 Egglhuber ............................. 125/21
6,119,673 * 9/2000 Nakaura ................................ 125/21

FOREIGN PATENT DOCUMENTS

5577419 * 6/1980 (JP) .

* cited by examiner

*Primary Examiner*—Derris H. Banks
(74) *Attorney, Agent, or Firm*—Breiner & Breiner, L.L.C.

(57) ABSTRACT

An object of the present invention is to provide a wire saw cutting method that is a method for cutting a plurality of silicon monocrystal ingots into wafers with a wire saw, wherewith high-precision cutting processing is possible, reducing wafer thickness and warping defects, etc. By shifting the positions of pieces of work in the cutting feed direction, providing time differentials to the cuts, and cutting the work sequentially, the work cut first is given the role of a wire guide, making it possible to stabilize the path of the wire. Thus cuts can be made in other ingots with the wire path stabilized, it becomes possible to reduce thickness and warping defects, and processing is made possible wherewith good wafer quality and stable yield are realized.

5 Claims, 3 Drawing Sheets

WIRE SAW CUTTING METHOD AND APPARATUS THEREFOR

BACKGROUND OF THE INVENTION

1. Field of the Invention

The present invention relates to improvements in a method for cutting a plurality of silicon monocrystal ingots into wafers, for example, using a wire saw. The present invention further relates to a wire saw cutting method and apparatus wherein, when cutting by bringing the object being cut (i.e. the work) into contact with an array of many strands of wire, the positions of plural pieces of work are shifted in the direction of cutting feed, whereby wire sway is reduced, and wafer thickness uniformity is made highly precise.

2. Description of the Related Art

Wire saw apparatuses are extensively used for cutting multiple pieces of hard and brittle materials such as ceramics, magnetic materials, and semiconductor materials such as silicon monocrystals, and efficiently manufacturing wafers of prescribed thickness in high volume.

To describe an example configuration of a wire saw apparatus used for cutting silicon monocrystal ingots, as diagrammed in FIG. 2A, a wire 4 is deployed so that it is wound parallel, at a constant interval, about the outer circumferences of three horizontally placed long grooved rollers 1, 2, and 3, with the wire 4 fed from a wire bobbin not shown taken up on another wire bobbin after it has traveled around and around the rollers 1, 2, and 3.

In the wire saw apparatus having the configuration described above, ordinarily one silicon monocrystal ingot is cut, but there are times when two or three ingots are cut simultaneously in the interest of productivity. In the case of cutting three monocrystal ingots, for example, these pieces of work 5 are bonded with adhesive materials 7 to work plates 6, and those work plates 6 are mechanically held in a feeder 9 via attachment holding mechanisms 8.

In order to simultaneously cut pluralities of wafers from silicon monocrystal ingots, the ingots, suspended from the feeder 9, are lowered toward the place where segments of the wire 4 are deployed at a certain interval in the axial direction between the upper two rollers 2 and 3 and are traveling in the same direction, and cutting is done by pressing the ingots against the wire 4. There is also a configuration wherein the monocrystal ingots are pressed against the wire while being raised, instead of being lowered.

In order to do cutting with the wire saw of the configuration described in the foregoing, the crystal axis angle was only adjusted in the horizontal direction, turning the silicon monocrystal ingots in the circumferential direction, and lining up the ingots so that the lower edges in the outer circumferential surfaces thereof were positioned in the same horizontal plane H, as diagrammed in FIG. 2A, to perform simultaneous processing on a plurality of ingots.

Because the performance differs between the top and the tail sides after the silicon monocrystal ingots are pulled up, they are cut to prescribed lengths for each specification wanted, and, when making wafers for the purpose of mass production, it is difficult to make the ingots of the same length, whereupon ingots having different lengths must be processed simultaneously.

As diagrammed in FIG. 2B, because monocrystal ingots having mutually different lengths are processed simultaneously, sway occurs in the wire segments passing the ends of those ingots, the paths of the wire segments running over the end surfaces of the ingots are destabilized, in which condition the wire segments cut into other ingots, which constitutes a cause of precision deterioration. In order to keep the wire from contacting the end surfaces of the ingots, moreover, it is necessary to adjust the way the wire is wound every time it is wound, and it is difficult to perform this adjustment in ordinary mass production processes.

SUMMARY OF THE INVENTION

An object of the present invention is to provide a wire saw cutting method and apparatus therefor wherewith, in a method for cutting a plurality of silicon monocrystal ingots into wafers with a wire saw, the problems noted above are resolved, and wherewith high-precision cutting processing is possible that realizes uniform wafer thickness and reduces warping defects.

As a result of making various investigations for the purpose of realizing high-precision cutting processing on multiple pieces of work set in a wire saw, the inventors discovered that, by shifting the positions of the pieces of work in the direction of cutting feed, and making cuts in the work in successive order, with a time differential between the cuts, the previously cut work is made to perform a wire guide role, so that the wire path can be stabilized. The inventors also discovered that cuts can be made in other ingots in the condition wherein the wire path is stabilized, making it possible to reduce thickness and warping defects, thus making it possible to perform processing that effects good wafer quality and stable product yield. Thus the present invention was perfected.

The present invention, then, is a wire saw cutting method that, in a cutting method that causes a plurality of objects to be cut to relatively make contact with an array of multiple strands of wire deployed at prescribed intervals, thus cutting them, provides time differentials for the cuts made in the objects to be cut at the beginning of cutting.

With the present invention, when performing cutting processing with a wire saw, the positions of multiple pieces of work are shifted in the direction of cutting feed, and time differentials are provided in the cuts made in the objects to be cut at the beginning of cutting, thereby making it possible to reduce wire sway, and greatly improve wafer thickness uniformity, thus making it possible to perform processing that effects good wafer quality and stable product yield.

DESCRIPTION OF THE PREFERRED EMBODIMENTS

What is in view in the present invention is a wire saw apparatus which has a support mechanism for supporting a plurality of objects to be cut, so that they can be relatively brought up against and removed from an array of multiple strands of wire deployed at prescribed intervals. The present invention is such a wire saw apparatus, characterized in that, for example, the support mechanism is configured so that it securely holds the objects to be cut to a work plate by adhesive materials, and, by means for varying the height of the adhesive materials, etc., time differentials are provided in cuts made to the objects to be cut at the beginning of cutting.

Figure 1:
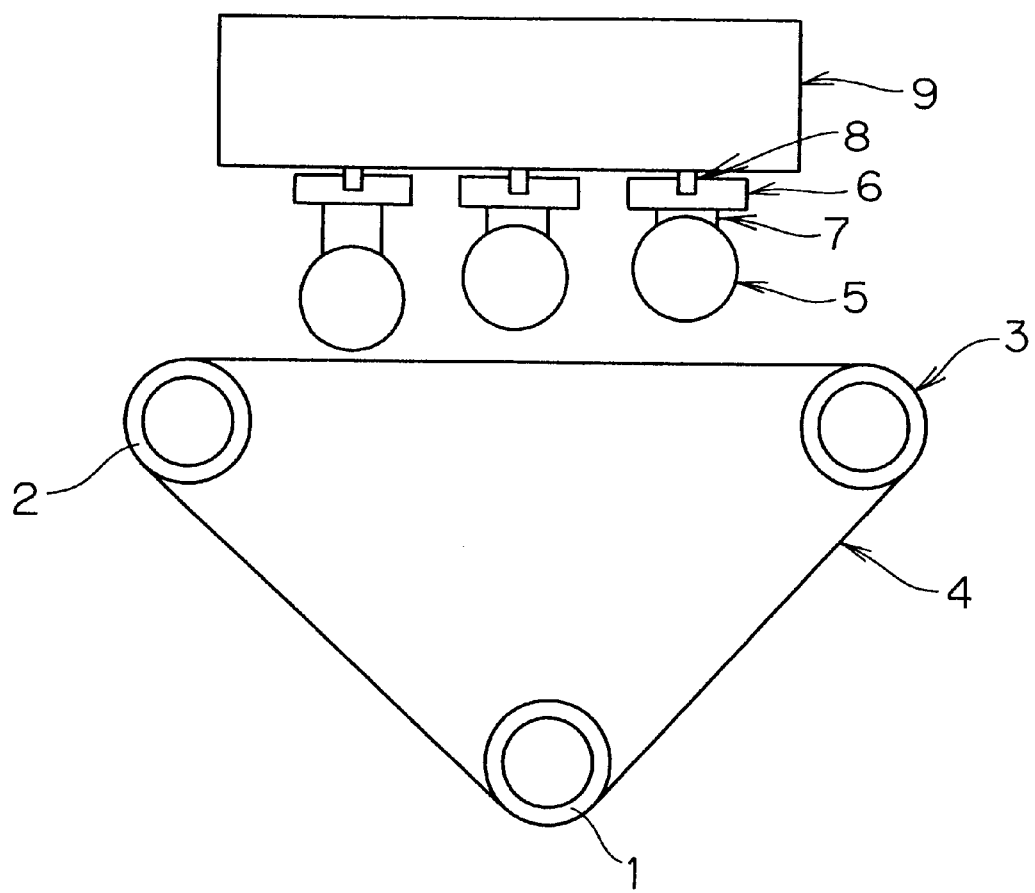
FIG. 1 is a diagram for describing the configuration of a wire saw apparatus representing one example of the cutting method of the present invention.

A detailed description is now given, making reference to the drawings. The wire saw diagrammed in FIG. 1 is configured such that a wire 4 is deployed so that it is wound in parallel at a constant interval about the outer circumferences of three long grooved rollers 1, 2, and 3 that are deployed horizontally, and such that the wire 4 that is fed out from a wire bobbin (not shown) is wound up on another wire bobbin after traveling around and around the outer circumferences of the rollers 1, 2, and 3.

Three pieces of work 5 are bonded with adhesive materials 7 at different heights, respectively, to the work plates 6, and the work plates 6 are mechanically held in a feeder 9 via attachment holding mechanisms 8. In the diagram, the positions of the work 5 are shifted in the direction of cutting feed by changing the dimensions of the adhesive materials 7 so that they strike the wire 4 in order from the left side as the feeder 9 descends.

When cutting feed is begun, the work on the left side in the diagram first strikes the wire 4 and is cut, and, after that work on the left side is made to function as a wire guide, stabilizing the path of the wire, the middle piece of work is cut, and then the work on the right side is cut, wherefore wafer thickness and warping defects are sharply reduced.

In the present invention, the order of work feed is discretionary so long as it is possible to provide suitable time differentials. If the longest of the three pieces of work described above is the middle one, for example, it is possible to feed that middle piece of work first, and then sequentially feed in the left and right pieces of work, or to feed in the left and right pieces of work simultaneously after feeding in the middle piece of work. In other words, so long as the configuration is made so that all of the work is not fed in simultaneously, then the feed order and time differentials can be selected appropriately according to the configuration of the wire saw in view, the work feed mechanism, and the form of the work, etc.

In the wire saw apparatus, moreover, with a configuration like that described in the foregoing, wherein multiple pieces of work are fed simultaneously, it is possible to employ adhesive materials 7 of different height, and work plates 6 of different thickness. It is also possible to provide any desired time differential to the work cutting by controlling the operation of (an) actuator(s) or the feed mechanism in the configuration having the feeder 9, for each piece of work.

Figure 2A:
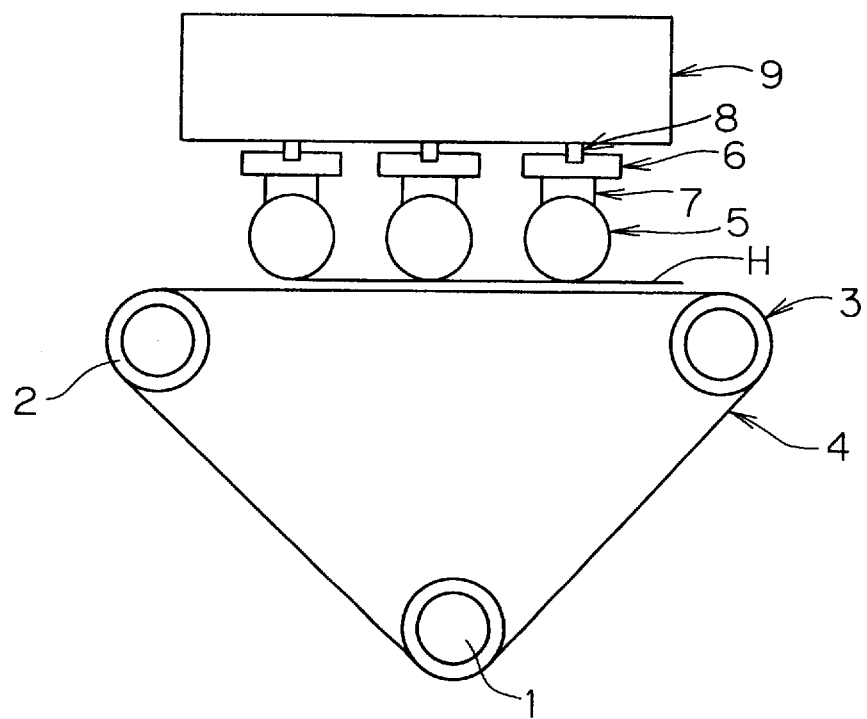
FIG. 2A is a diagram for describing the configuration of a wire saw apparatus representing one example of a conventional cutting method.
Figure 2B:
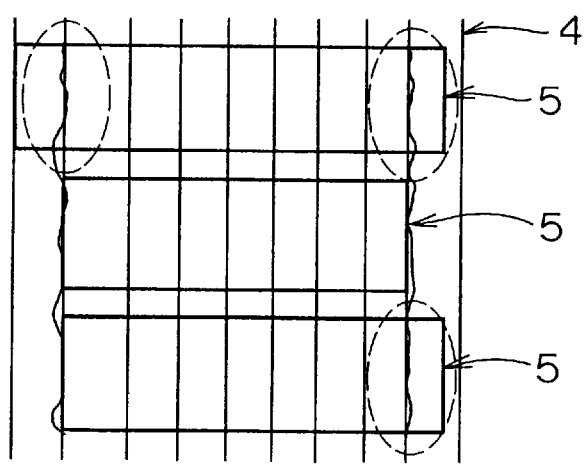
FIG. 2B is a diagram for describing the upper surfaces of objects to be cut that conceptually represents the way in which wire segments sway.

Furthermore, even if the configuration is one where the same feed is performed as with the conventional feeder 9 diagrammed in FIG. 2, it is possible to provide any desired time differential to the work cutting by causing the placement of the upper two rollers 2 and 3 to be inclined in one direction or the other.

Cutting processing was performed on silicon monocrystal ingots using the wire saw apparatus diagrammed in FIG. 1 described earlier. At that time, the three pieces of work 5, respectively, were bonded with the adhesive materials 7 to the work plates 6 at different heights, and the configuration was made so that the pieces of work 5 struck the wire 4 in order from the left side, as diagrammed, when the feeder 9 descended.

After adjusting the angle of the crystal axis of each piece of work 5, slurry nozzles were deployed between the pieces of work 5, and, while causing prescribed cutting slurry to flow down therefrom, the wire was set at a running speed of 500 m/min and a cutting speed of 0.5 mm/min, time differentials were imparted to the cutting of the three silicon monocrystal ingots, and cutting processing was performed sequentially to manufacture silicon monocrystal wafers.

Figure 3A:
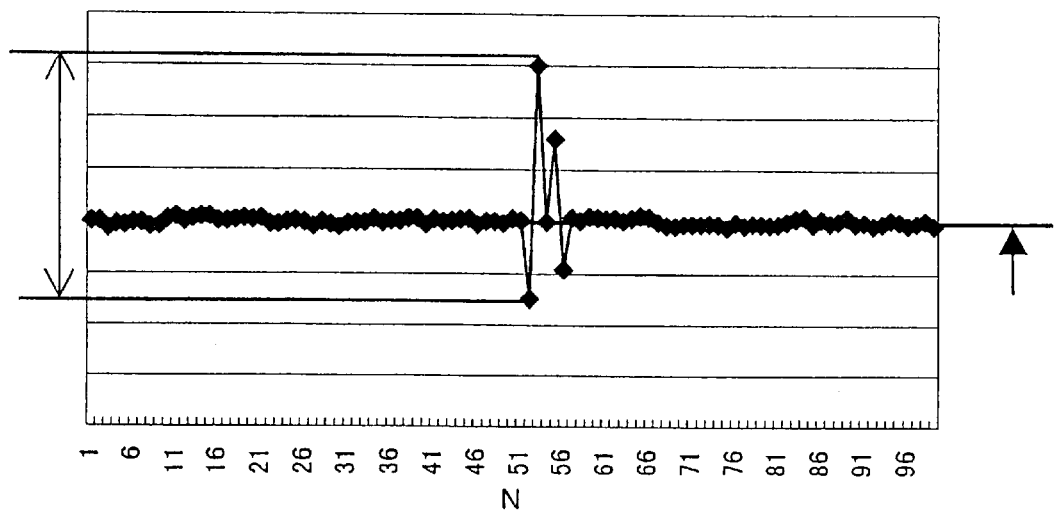
FIG. 3 is a graph that plots thickness against the wafer position in the longitudinal direction of the ingots, representing variation in wafer thickness.

Also, under the same conditions as noted above, except for making the heights of the adhesive materials 7 the same, silicon monocrystal wafers were produced using the conventional method of simultaneously cutting the three silicon monocrystal ingots. The variation in the thickness of wafers made from the shortest of the three silicon monocrystal ingots was measured, the results whereof are represented in FIG. 3A.

Figure 3B:
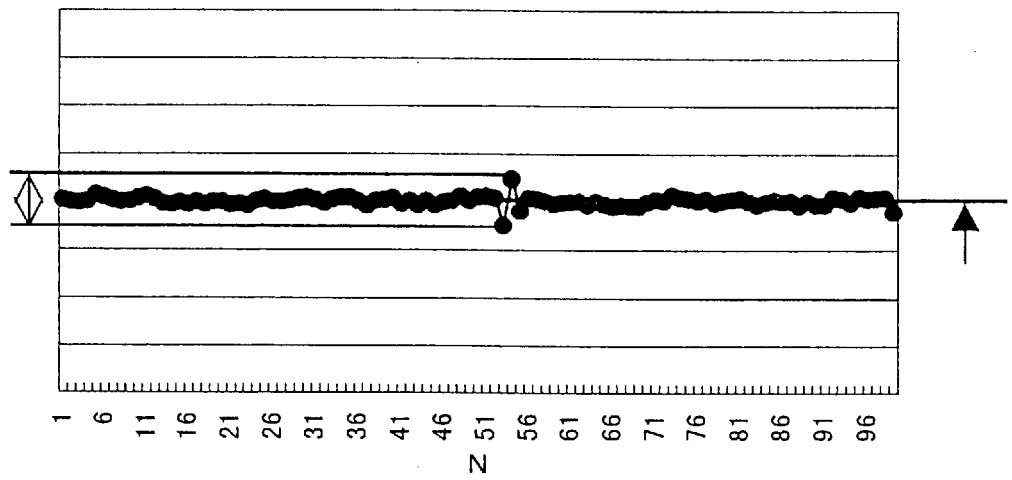

The variation in the thickness of the wafers made with cutting processing based on the present invention was also measured, and the results are represented in FIG. 3B. When a comparison was made, taking the variation in the thickness of wafers obtained with the conventional method, as represented in FIG. 3A, as 100%, that variation was found to be reduced sharply to 20% by the method based on the present invention.

What is claimed is:

1. A cutting method using a wire saw for cutting a plurality of objects by bringing said objects and a plurality of wire lines arrayed at predetermined intervals into contact, the method comprising a step of, upon commencement of cutting of said plurality of objects, initiating an individual cutting in each of said objects successively following a time lag between each individual cutting.

2. The cutting method according to claim 1 further comprising carrying said plurality of wire lines and the plurality of objects on a support wherein said wire lines and said objects are disposed opposite to each other at initial predetermined distances between the wire lines and the objects, said predetermined distances being set before initiating cutting and differing from one another so as to provide said time lag.

3. A wire saw apparatus comprising a support for supporting a plurality of objects to be cut and enabling said objects to move close to and away from a plurality of wire lines arrayed at predetermined intervals to cut said objects by contacting said objects to said wire lines or contacting said wire lines to said objects; and a means for varying a predetermined distance between said wire lines and said objects, said distance being set prior to initiating cutting so as to initiate cutting in each of said objects successively following a time lag between each cutting.

4. The wire saw apparatus according to claim 3, wherein said support is provided with a means for holding each of said objects, each of said means being positionable at different heights so as to vary said predetermined distance between the wire lines and the objects.

5. The wire saw apparatus according to claim 3, wherein the means for varying said predetermined distance between the wire lines and the objects to be cut is a means for varying positioning of grooved rollers for the wire lines to incline the wire lines with respect to a plane in which cutting of the objects is initiated.

* * * * *